(12) United States Patent
Smiljanovski et al.

(10) Patent No.: US 10,006,342 B2
(45) Date of Patent: Jun. 26, 2018

(54) EXHAUST FLOW VALVE FOR TWIN-SCROLL TURBINE AND OPERATING METHODS THEREOF

(71) Applicant: Ford Global Technologies, LLC, Dearborn, MI (US)

(72) Inventors: Vanco Smiljanovski, Bedburg (DE); Helmut Matthias Kindl, Aachen (DE); Joerg Kemmerling, Monschau (DE); Andreas Kuske, Geulle (NL); Franz Arnd Sommerhoff, Aachen (DE); Jens Dunstheimer, Cologne (DE); Ludwig Stump, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 671 days.

(21) Appl. No.: 14/610,649

(22) Filed: Jan. 30, 2015

(65) Prior Publication Data

US 2015/0233283 A1 Aug. 20, 2015

(30) Foreign Application Priority Data

Feb. 20, 2014 (DE) .................. 10 2014 203 081

(51) Int. Cl.
*F02B 37/02* (2006.01)
*F02B 37/22* (2006.01)
*F02B 37/00* (2006.01)

(52) U.S. Cl.
CPC ............ *F02B 37/025* (2013.01); *F02B 37/22* (2013.01); *F02B 37/002* (2013.01); *Y02T 10/144* (2013.01)

(58) Field of Classification Search
CPC ..... F02B 37/025; F02B 37/022; F02B 37/002
(Continued)

(56) References Cited

U.S. PATENT DOCUMENTS 3,559,397 A * 2/1971 Navarro ............... F02B 37/013
60/280
4,177,006 A * 12/1979 Nancarrow .......... F02B 37/025
415/151

(Continued)

FOREIGN PATENT DOCUMENTS

DE 3145835 A1 5/1983
DE 19740609 A1 12/1998
(Continued)

*Primary Examiner* — Jason T Newton
(74) *Attorney, Agent, or Firm* — Greg Brown; McCoy Russell LLP

(57) ABSTRACT

A supercharged engine and operating methods thereof are described for adjusting an extent of fluidic coupling between separate channels of a two-channel turbine. In one particular example, a longitudinally displaceable flow transfer valve is arranged for movement lateral to the exhaust airflow that provides coupling between the channels, a position of the flow transfer valve within a flow transfer duct controlling the extent of fluidic coupling in addition to the rate of exhaust-gas flow through a blow-off line that conducts airflow past a rotor of the two-channel turbine. In this way, the flow transfer valve according to the present disclosure advantageously allows for adjusting a mode of supercharging based on one or more engine conditions to control the extent of fluidic coupling using a simplified valve arrangement.

16 Claims, 8 Drawing Sheets

(58) Field of Classification Search
USPC .......................................................... 60/602
See application file for complete search history.

(56) References Cited

U.S. PATENT DOCUMENTS

| | | | | |
|---|---|---|---|---|
| 4,339,922 | A * | 7/1982 | Navarro | F02B 37/001 415/148 |
| 4,513,571 | A * | 4/1985 | Jenny | F02B 33/42 60/603 |
| 6,250,079 | B1 * | 6/2001 | Zander | F02B 37/025 60/602 |
| 7,269,950 | B2 * | 9/2007 | Pedersen | F01D 17/14 417/406 |
| 2008/0000460 | A1 * | 1/2008 | Hertweck | F02B 37/025 123/559.1 |
| 2010/0024417 | A1 * | 2/2010 | Pierpont | F01N 13/107 60/605.2 |
| 2010/0059026 | A1 * | 3/2010 | Schmalzl | F02B 37/025 123/559.1 |
| 2011/0232282 | A1 * | 9/2011 | Anschel | F01D 9/026 60/615 |
| 2012/0090318 | A1 * | 4/2012 | Melchior | F01D 9/026 60/598 |
| 2012/0251298 | A1 * | 10/2012 | Moore | F01D 17/143 415/157 |
| 2014/0230431 | A1 * | 8/2014 | Kindl | F02B 37/025 60/605.1 |
| 2014/0230432 | A1 * | 8/2014 | Kindl | F02B 37/001 60/605.1 |
| 2014/0331667 | A1 * | 11/2014 | Kindl | F02M 26/43 60/602 |
| 2017/0370279 | A1 * | 12/2017 | Stilgenbauer | F02B 37/025 |

FOREIGN PATENT DOCUMENTS

| | | |
|---|---|---|
| DE | 202013100774 U1 | 3/2013 |
| EP | 2246543 A1 | 11/2010 |
| JP | H07247859 A | 9/1995 |
| JP | H09189208 A | 7/1997 |
| JP | 2008014250 A | 1/2008 |
| WO | 2011101005 A1 | 8/2011 |

* cited by examiner

EXHAUST FLOW VALVE FOR TWIN-SCROLL TURBINE AND OPERATING METHODS THEREOF

CROSS REFERENCE TO RELATED APPLICATIONS

The present application claims priority to German Patent Application No. 102014203081.1, filed Feb. 20, 2014, the entire contents of which are hereby incorporated by reference for all purposes.

FIELD

The present description relates to a supercharged internal combustion engine and methods for operating an engine of said type.

BACKGROUND AND SUMMARY

Supercharged internal combustion engines may be operated in different modes based on engine output. For example, when an engine is operated at lower engine speed and/or load range, impulse supercharging may be employed to enhance the operating behavior of the engine. Impulse supercharging advantageously uses the dynamic wave produced during charge exchange for supercharging to enhance engine operations, which may produce pressure fluctuations on the turbine. Alternatively, at higher engine speeds, a more constant exhaust-gas pressure may be desired for smoother engine operations since the turbine operates with a higher efficiency when shocks and pressure fluctuations on the turbine are reduced. Thus, ram supercharging may be employed to reduce fluctuating partial loads on the turbine during periods of high engine output.

Evacuation of combustion gases out of an engine cylinder during charge exchange is based substantially on two types of mechanisms. When an outlet valve opens close to bottom dead center, charge exchange begins and combustion gases flow at a high speed through the outlet opening into the exhaust-gas discharge system on account of the high pressure level prevailing in the cylinder at the end of combustion. The rate of flow may be based on the associated pressure difference between the combustion chamber and an exhaust line associated therewith. Said pressure-driven flow process is assisted by a high pressure peak which is also referred to as a pre-outlet shock that propagates along the exhaust line at the speed of sound, the pressure being dissipated, or reduced, to a greater or lesser extent with increasing distance traveled as a result of frictional forces present. During the further course of charge exchange, the pressures in the cylinder and in the exhaust line are equalized, and combustion gases are no longer evacuated in a pressure-driven manner but instead are discharged as a result of the reciprocating movement of the piston of the combustion chamber.

At low loads or engine speeds where low exhaust-gas flow rates prevail, pre-outlet shock may be advantageously utilized for impulse supercharging, as a result of which it is possible to obtain high turbine pressure ratios even at low turbine rotational speeds. To utilize the dynamic wave phenomena occurring in the exhaust-gas discharge system, in particular the pre-outlet shocks, for impulse supercharging to enhance the operating behavior of the internal combustion engine, the pressure peaks or pre-outlet shocks in the exhaust-gas discharge system must be maintained. It is particularly advantageous if the pressure fluctuations are intensified in the exhaust lines. It is therefore expedient for the cylinders to be grouped, or for the exhaust lines to be merged, in such a manner that the high pressures, in particular the pre-outlet shocks of the individual cylinders, in the exhaust-gas discharge system are maintained during operation. However, turbine efficiency increases when shocks or fluctuating partial loads (e.g., pressure fluctuations) are reduced. Thus, at high engine speeds, a constant exhaust-gas pressure, for which reason a pressure with small fluctuations upstream of the turbine is employed in order to realize so-called ram supercharging. As a result of a correspondingly large exhaust-gas volume upstream of the turbine, pressure pulsations in the exhaust lines can be smoothed by grouping the cylinders into merged exhaust flows.

A conflict thus arises in exhaust-gas discharge systems with regard to optimal performance at low engine speeds and high engine speeds, or so as to optimize the exhaust-gas discharge system both with regard to low exhaust-gas flow rates and with regard to relatively high exhaust gas flow rates. Grouping the cylinders to realize impulse supercharging produces expedient operating behavior at low engine speeds, but degrades turbine efficiency at higher speeds due to pressure fluctuations. In contrast, if a large exhaust-gas volume is realized upstream of the turbine in order to be able to utilize the advantages of ram supercharging by increasing the volume of the exhaust lines to smooth the pressure fluctuations at relatively high engine speeds, the operating behavior at low engine speeds, the so-called low end torque, may be impaired.

Concepts are known in which the two exhaust manifolds of the two cylinder groups are connected to and separated from one another in a manner that depends on engine conditions. The exhaust-gas discharge system is then configured as a function of the engine speed or gas dynamics, such that supercharging of the internal combustion engine by impulse supercharging is realized by separating the exhaust manifolds whereas supercharging of the internal combustion engine by ram supercharging is realized by connecting the exhaust manifolds. However, disadvantages arise when connections are positioned close to the outlet openings of the cylinders, since the residual gas problems described above, and associated knocking problem, are abetted, that is to say intensified. Alternate systems may adjust a supercharging mode based on the position of a valve such as a poppet valve whose position can be either open or closed. However, such systems have the weakness that open/close states of the valve do not allow fine adjustment of the exhaust coupling across the range of operating conditions. Said differently, a difficulty arises since the extent of exhaust coupling between each of the two channels is not allowable, particularly in combination with exhaust gas blow-off, which may be advantageous under some conditions.

The inventors have recognized issues with such approaches and herein describe a two-channel turbine comprising a longitudinally displaceable flow transfer valve arranged within a flow transfer duct that couples a first channel of the two-channel turbine to a second channel, the valve arranged lateral relative to the flow of exhaust gas. Structural features of the flow transfer valve are further included that allow for controlling the extent of communication between the first and second channels, in addition to a waste gate passage based on a position of the valve relative to the flow transfer duct. In this way, the technical result is achieved that the flow transfer valve allows for adjusting a mode of supercharging based on the extent of fluidic coupling using a simplified valve arrangement and controls thereof.

In one particular example, positioning the flow transfer valve into a rest position within the duct completely separates the first and second channels of the two-channel turbine while simultaneously blocking exhaust airflow to the waste gate passage, the exhaust airflow through the first and second channels being directed separately to a rotor of the two-channel turbine. Then, adjusting the position of the flow transfer valve to a first position within the duct allows communication between only the first and second channels of the two-channel turbine while simultaneously blocking exhaust airflow to the waste gate passage, wherein the extent of communication between the first and second channels is determined responsive to the extent that a plunger-like end of the flow transfer valve occupies a first recess of the flow transfer duct. Further adjustment into a second position within the duct allows communication between both the first and second channels as well as the waste gate passage included therewith. Based on the structural features of the valve described in greater detail below, in the second position, the extent of communication between both the first and second channels and the waste gate passage is determined responsive to the position of the plunger-like end relative to a second recess of the flow transfer duct, which advantageously allows for fine adjustment of the exhaust blow-off. In other words, the system according to the present disclosure allows for the rate of exhaust-gas flow conducted past a rotor of the two-channel turbine via a blow-off line to be adjusted based on the position of the valve in the duct.

In an internal combustion engine according to the present disclosure, the volume of the exhaust-gas discharge system communicating with an individual channel of the turbine can be varied, specifically by virtue of the two channels of the turbine being connected or separated based on the position of the flow transfer valve relative to the flow transfer duct. Consequently, it is also possible for the exhaust-gas volume or the exhaust-gas discharge system upstream of the at least one rotor of the two-channel turbine to be adapted to different operating conditions of the internal combustion engine, in particular to different exhaust-gas flow rates or different engine speeds, and optimized in this regard.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 5A:
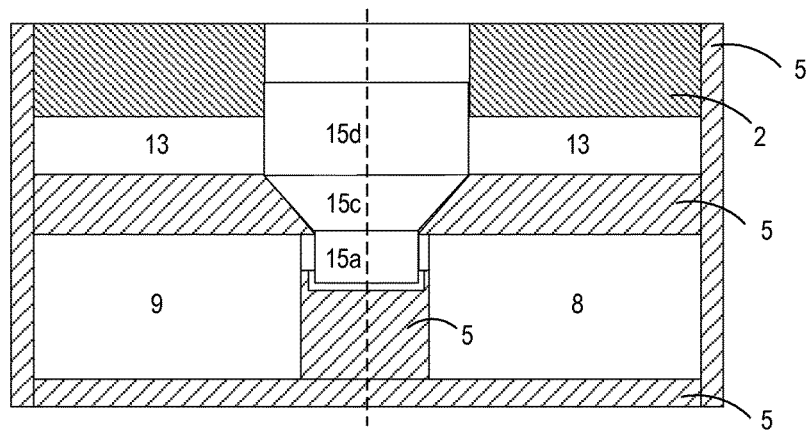
FIGS. 5A-C illustrate a third representation of the present disclosure.
Figure 5B:
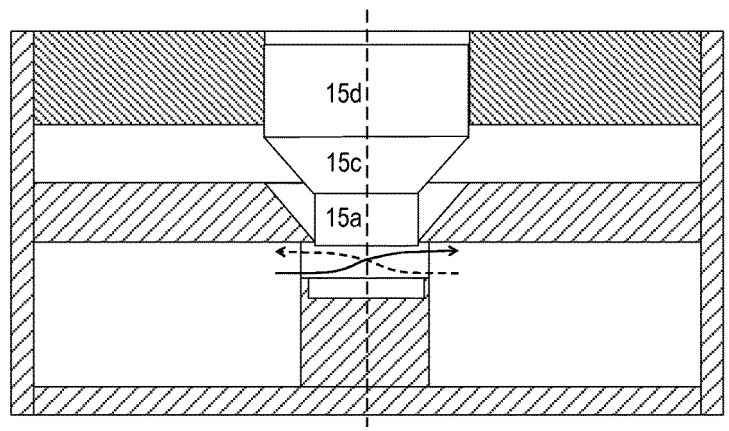
Figure 5C:
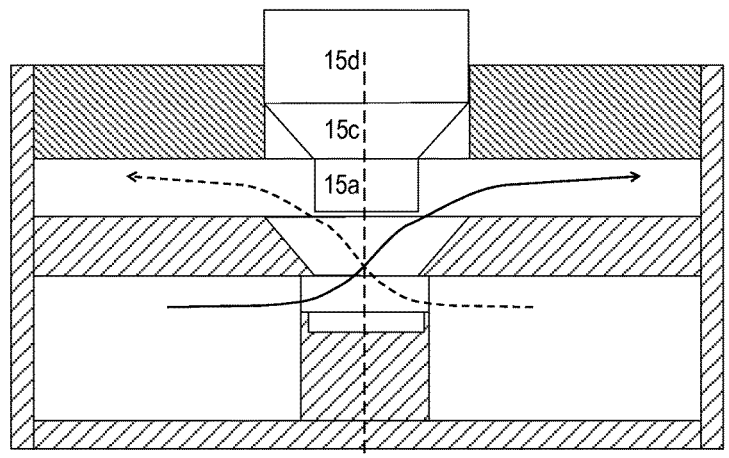
Figure 6:
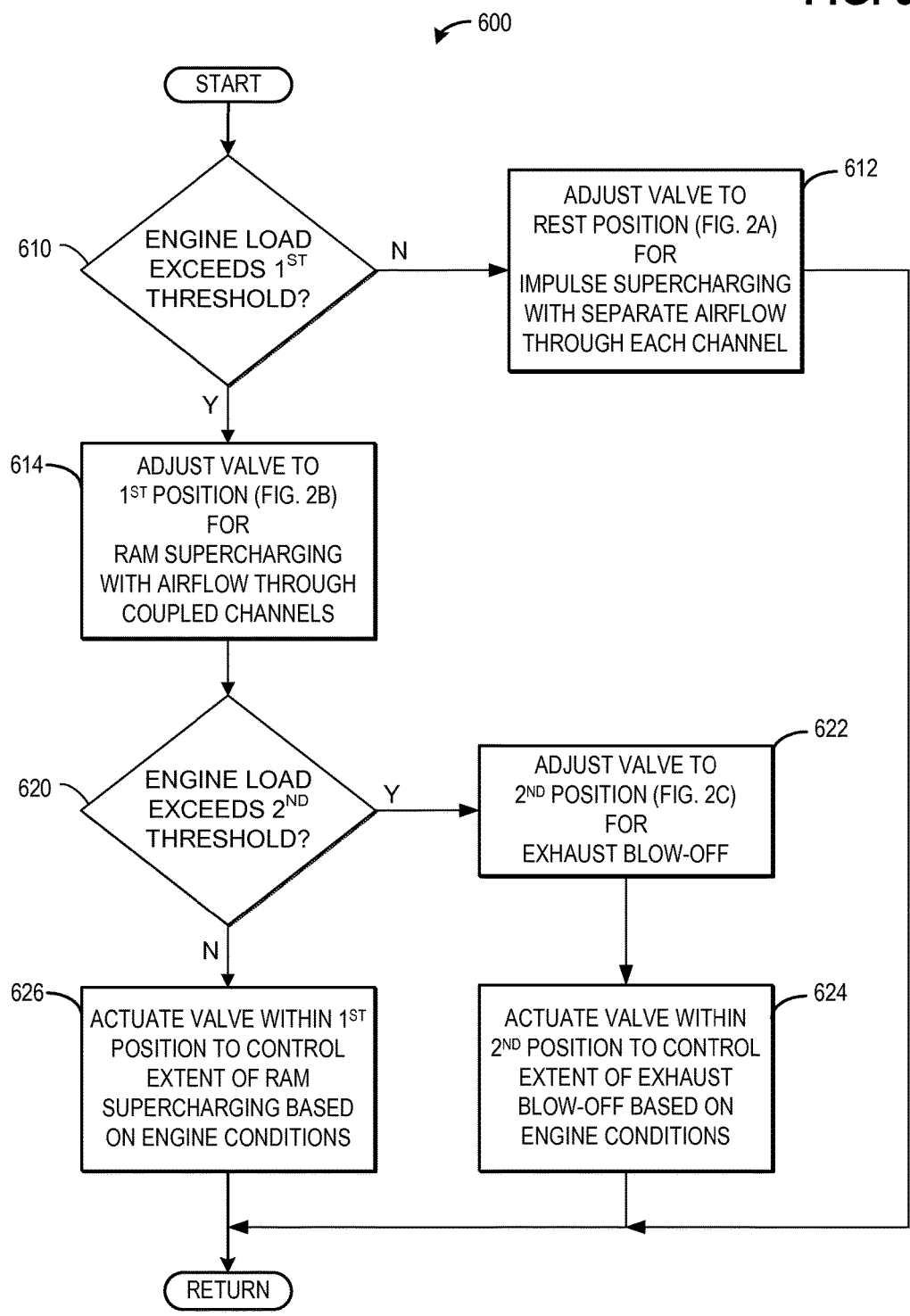
FIG. 6 shows an example routine for controlling the position of the valve to adjust the extent of coupling between exhaust channels and the waste gate passage.

A twin-scroll turbine is described for controlling the extent of communication between exhaust channels based on the position of a flow transfer valve. For this reason, FIG. 1 shows exemplary two-channel turbines in the dual and twin configurations. Then, FIGS. 2A through 3C depict a fragment of the housing according to a first embodiment. FIGS. 4A-D are included to illustrate a second representation of the flow transfer valve and duct while FIGS. 5A-C illustrate a third representation. A supercharged engine may be configured to control the position of the valve to control the extent of coupling between the exhaust passages, in addition to controlling the extent of exhaust blow-off to a waste gate passage conveniently positioned therewith. For this reason, FIG. 6 shows an example routine for adjusting the extent of coupling between the exhaust channels and waste gate passage based on a position of the flow transfer valve in the duct.

Internal combustion engines have a cylinder block and a cylinder head connected to one another to form the cylinders. The cylinder head conventionally serves to hold the valve drive. To control the charge exchange, an internal combustion engine includes control elements in the form of valves and actuating devices for actuating the control elements. The valve actuating mechanism controls the movement of the valves, including the valves themselves, and is referred to as the valve drive. During charge exchange, the combustion gases are discharged via the outlet openings of the at least two cylinders, and the charging of the combustion chambers, that is to say the induction of the fresh mixture or charge air, takes place via inlet openings.

In previous implementations, the exhaust lines adjoining outlet openings may be at least partially integrated in the cylinder head and merged to form a common overall exhaust line or in groups to form two or more overall exhaust lines. The merging of exhaust lines to form an overall exhaust line is referred to generally, and within the context of the present disclosure, as an exhaust manifold. The way in which the exhaust lines of the cylinders are merged, that is to say the specific configuration of the exhaust-gas discharge system, depends substantially on the operating ranges for which the operating behavior of the internal combustion engine is to be optimized.

In the case of supercharged internal combustion engines in which at least one turbine of an exhaust-gas turbocharger is provided in the exhaust-gas discharge system and which are intended to exhibit satisfactory operating behavior in the lower engine speed and/or load range, that is to say in the case of relatively low exhaust-gas flow rates, so-called impulse supercharging may be desired. The dynamic wave phenomenon which occurs in the exhaust-gas discharge system, in particular during charge exchange, is thus utilized for the purpose of supercharging and enhances the operating behavior of the internal combustion engine.

Evacuation of combustion gases out of a cylinder of the internal combustion engine during the charge exchange is based substantially on two different mechanisms. When the outlet valve opens close to bottom dead center at the start of the charge exchange, the combustion gases flow at high speed through the outlet opening into the exhaust-gas discharge system on account of the high pressure level prevailing in the cylinder at the end of combustion. The rate of exhaust flow may be further associated with the high pressure difference between the combustion chamber and exhaust line extending therefrom. Said pressure-driven flow process is assisted by a high pressure peak which is also referred to as a pre-outlet shock that propagates along the exhaust line at the speed of sound, with the pressure being dissipated, that is to say reduced, to a greater or lesser extent with increasing distance traveled as a result of friction. During the further course of charge exchange, the pressures in the cylinder and in the exhaust line are equalized, such that the combustion gases are no longer evacuated primarily in a pressure-driven manner but rather are discharged as a result of the reciprocating movement of the piston.

At low loads or engine speeds, that is to say low exhaust-gas flow rates, the pre-outlet shock may advantageously be utilized for impulse supercharging, as a result of which it is possible to obtain high turbine pressure ratios even at low turbine rotational speeds. In this way, it is possible by means of exhaust-gas turbocharging to generate high charge-pressure ratios, that is to say high charge pressures on the inlet side, even in the case of only low exhaust-gas flow rates, that is to say at low loads and/or low engine speeds.

Impulse supercharging may be particularly advantageous for accelerating the turbine rotor, that is to say for increasing the turbine rotational speed, which may fall to a noticeable extent during idle operation of the engine or at low load. In addition, in the event of an increased load demand, it is desirable for the turbine rotational speed to be increased again with as little delay as possible by means of the exhaust-gas flow. The inertia of the at least one rotor and the friction in the shaft bearing arrangement may act to slow acceleration of the rotor to higher rotational speeds, which may therefore hinder an immediate rise in the charge pressure.

To overcome such frictional forces, the dynamic wave phenomena occurring in the exhaust-gas discharge system, in particular the pre-outlet shocks, are utilized for impulse supercharging that may enhance the operating behavior of the internal combustion engine. In particular, advantages may be gained if the pressure fluctuations are intensified in the exhaust lines, but at least do not attenuate one another or cancel one another out. For this reason, cylinders may be grouped, or the exhaust lines may be merged, in such a manner that the high pressures, in particular the pre-outlet shocks of the individual cylinders, in the exhaust-gas discharge system are maintained during operation.

The subject matter of the present disclosure thus encompasses internal combustion engines in which cylinders are grouped. In particular, at least two cylinders are configured in such a way as to form two groups. The exhaust lines of the cylinders of each cylinder group merge to form a respective overall exhaust line, thus forming an exhaust manifold. Here, the cylinders may be configured in such a way that the dynamic wave phenomena in the exhaust lines of the cylinders of a group have the least possible adverse effect on one another.

In a cylinder head having four cylinders in an in-line arrangement, it is advantageous in this regard for two cylinders which have an ignition interval of 360° CA to be combined in each case to form a cylinder group. For example, if the ignition in the cylinders is initiated in accordance with the ignition sequence 1-2-4-3 or in accordance with the ignition sequence 1-3-4-2, it is advantageous for the outer cylinders to be combined to form a first group and for the inner cylinders to be combined to form a second group.

Within the context of the present disclosure, the expression "internal combustion engine" encompasses Otto-cycle engines, diesel engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

However, under some engine operating conditions, impulse supercharging may have disadvantages. For example, charge exchange may be impaired as a result of the pressure fluctuations in the exhaust-gas discharge system. In this way, the cylinders of a group may have an interfering, that is to say detrimental effect on one another during charge exchange. The pressure waves originating from a cylinder run not only through the at least one exhaust line of said cylinder but also along the exhaust lines of the other cylinders of said group, perhaps as far as the outlet opening provided at the end of a respective line. Exhaust gas which has already been expelled or discharged into an exhaust line during the charge exchange can thus pass back into the cylinder again as a result of the pressure wave originating from another cylinder. In particular, a positive pressure prevailing at the outlet opening of a cylinder or the pressure wave of another cylinder propagating along the exhaust line in the direction of the outlet opening may counteract the evacuation of the combustion gases out of said cylinder, which is disadvantageous. In said phase of charge exchange, the combustion gases are discharged primarily owing to the reciprocating movement of the piston. In individual situations, it may even be the case that exhaust gas originating from one cylinder passes into another cylinder before the outlet thereof closes. An impaired charge exchange leads to additional disadvantages, in particular under increasing load and with increasing engine speed. The exhaust gas situated in the cylinder, that is to say the residual gas fraction remaining in the cylinder, has a significant influence on knocking behavior of an applied-ignition internal combustion engine, wherein the risk of knocking combustion rises with increasing exhaust-gas fraction.

Turbine efficiency may be increased such that a turbine operates more effectively without shocks and without being subjected to fluctuating partial loads at high engine speed. To enable a turbine provided downstream of the cylinders in the exhaust-gas discharge system to be operated optimally at high engine speeds, it is desirable for a turbine to be acted on with a constant exhaust-gas pressure, in so much as is possible, for which reason a pressure which varies little upstream of the turbine provides the so-called ram supercharging.

One method that provides a constant exhaust-gas pressure is increasing an exhaust-gas volume upstream of the turbine. As a result of a correspondingly large exhaust-gas volume upstream of the turbine, the pressure pulsations in the exhaust lines can be smoothed. In this respect, the grouping of the cylinders, whereby the exhaust lines are combined in groups, resulting in the volume of the exhaust-gas discharge system upstream of the turbine being divided into a plurality of partial volumes may be counterproductive. With regard to ram supercharging, it would rather be advantageous for the exhaust lines of all the cylinders to be merged into a single overall exhaust line in order to make the exhaust-gas volume of the exhaust-gas discharge system upstream of a turbine arranged in said overall exhaust line as large as possible, that is to say to maximize said exhaust-gas volume, and to minimize pressure fluctuations in some instances.

In view of the above, a conflict of aims arises in designing an exhaust-gas discharge system so as to optimize the exhaust-gas discharge system both with regard to low engine speeds and with regard to high engine speeds, or so as to optimize the exhaust-gas discharge system both with regard to low exhaust-gas flow rates and with regard to relatively high exhaust gas flow rates. Grouping cylinders in order to realize impulse supercharging leads to an expedient operating behavior at low engine speeds, but disadvantages arise at relatively high engine speeds. In contrast, if as large an exhaust-gas volume as possible is realized upstream of the turbine in order to utilize the advantages of ram supercharging at relatively high engine speeds, the operating behavior at low engine speeds, the so-called low end torque, is impaired.

Concepts are known in which the two exhaust manifolds of the two cylinder groups can be connected to and separated from one another. In particular, the exhaust-gas discharge system is configured as a function of the engine speed or the gas dynamics such that supercharging of the internal combustion engine by impulse supercharging can be realized by separating the exhaust manifolds and supercharging of the internal combustion engine by ram supercharging can be realized by connecting the exhaust manifolds. However, a disadvantage of the concepts described above is that, as a result of the connection of the manifolds, a connection is realized close to the outlet openings of the cylinders, whereby the residual gas problem described above, and the associated knocking problem, is abetted, or intensified. The system according to the present disclosure instead provides a supercharged internal combustion engine which permits optimized operation over the entire operating range, in particular both at low engine speeds and at relatively high engine speeds. In addition, methods for operating an internal combustion engine of said type are also enabled.

Figure 1A:
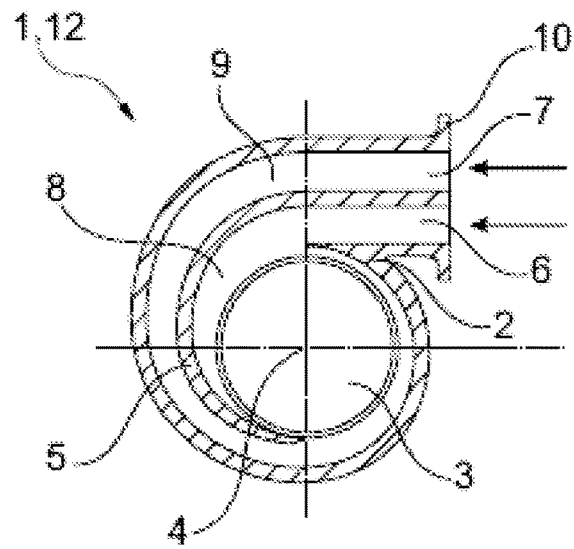
FIG. 1A schematically shows a dual-flow turbine, sectioned perpendicularly to the axis of rotation of the rotor.
Figure 1B:
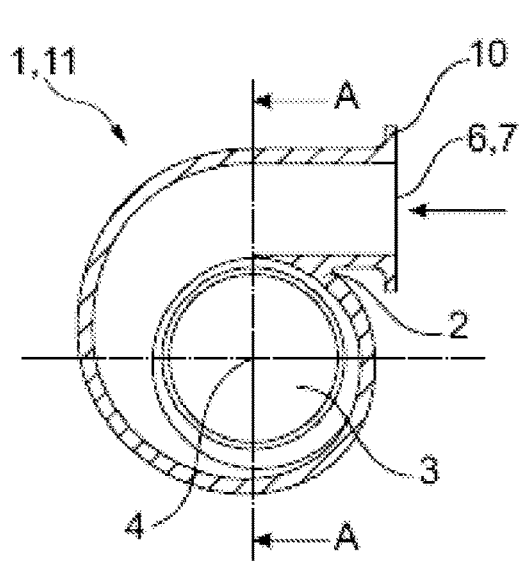
FIG. 1B schematically shows a twin-flow turbine, sectioned perpendicularly to the axis of rotation of the rotor.
Figure 1C:
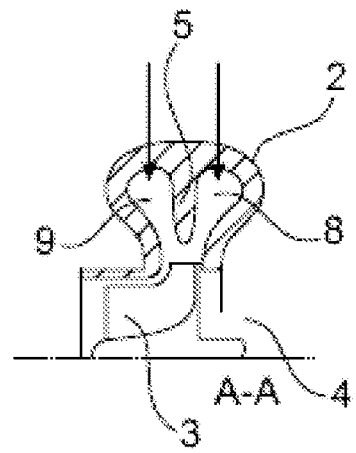
FIG. 1C schematically shows the twin-flow turbine of FIG. 1B, along the section A-A indicated.

Turning now to a description of the two-channel turbine and flow transfer valve, FIGS. 1A-C illustrate an exemplary twin-scroll turbine.

Embodiments of the supercharged internal combustion engine are advantageous in which the two-channel turbine is a dual-flow turbine. A dual-flow turbine exhibits greater efficiency, and increased flow impingement on the rotor, in relation to the twin-flow turbine. Furthermore, the dual-flow turbine can be subjected to greater thermal loading. The latter advantage emerges from the arrangement of the channels one on top of the other. FIG. 1A schematically shows a dual-flow turbine, sectioned perpendicularly to the axis of rotation of the rotor. As one example, FIG. 1a schematically shows dual-flow turbine 12, sectioned perpendicularly to the axis of rotation 4 of rotor 3. The illustrated dual-flow turbine 12 is an example of a two-channel turbine 1, that is to say of a turbine 1 with two channels 8, 9. The turbine 1 has a turbine housing 2 in which a rotor 3 is mounted on a rotatable shaft 4.

In a dual flow configuration, the dual-flow turbine 12 is characterized in that the two channels 8, 9 are arranged one on top of the other and, at least along an arc-shaped segment, surround rotor 3 in spiral form at different radii. The two inlet openings 6, 7 of dual-flow turbine 12 are thus arranged in flange 10 of housing 2 at different radial distances from the shaft 4 of turbine 1, wherein each inlet opening 6, 7 is adjoined to a channel 8, 9 of the turbine 1 and such that the two channels 8, 9 are separated from one another by means of housing wall 5 as far as rotor 3. In this way, the exhaust-gas streams within the two channels 8, 9 are conducted separately from one another to the rotor 3. The two channels 8, 9 are open toward rotor 3 in each case over a circular arc-shaped segment of 180°.

Embodiments of the supercharged internal combustion engine are also advantageous in which the two-channel turbine is a twin-flow turbine. Herein, it is sought to explain only the differences in relation to the dual-flow turbine illustrated in FIG. 1A, for which reason reference is otherwise made to FIG. 1A and the associated description. The same reference symbols have been used for the same components. FIG. 1B schematically shows a twin-flow turbine, sectioned perpendicularly to the axis of rotation of the rotor. In a twin-flow configuration, twin-flow turbine 11 is characterized in that the two channels 8, 9 are arranged adjacent to one another and, at least along an arc-shaped segment, surround rotor 3 in spiral form at substantially equal radii. The two inlet openings 6, 7 of twin-flow turbine 11 are arranged in housing 5 so as to be spaced apart from shaft 4 of turbine 1 by the same radial distance. FIG. 1C shows the twin-flow turbine 11 along the section A-A indicated in FIG. 1B. Housing wall 5 of twin-flow turbine 11 may be subjected to significantly greater thermal loading at its free end than that of dual-flow turbine 12, in particular in the transition region to rotor 3, as can be seen from FIG. 1C.

The shut-off element or flow transfer valve according to the present disclosure has numerous advantages in relation to other shut-off elements such as flaps and the like, in particular with regard to sealing action, adjustment of the blown-off exhaust-gas flow rate and thermal load capacity. The high thermal loading of the shut-off element results from the arrangement in the turbine housing.

The conflict of aims which is known from prior implementations results from the different demands placed on the exhaust-gas volume situated upstream of the at least one rotor by the ram supercharging and impulse supercharging, specifically on the one hand the provision of a small volume, in order to maintain the gas dynamics with intense pressure pulses, for the purpose of realizing impulse supercharging in the case of low engine speeds, and on the other hand the provision of as large a volume as possible, in order to deplete the pressure peaks and smooth the exhaust-gas pressure, for the purposes of ram supercharging in the case of relatively high engine speeds, which is herein resolved.

For example, in the case of high gas dynamics, the two channels of the turbine and thus the exhaust systems of the cylinder groups remain separate from one another, such that each channel communicates only with the exhaust lines of that cylinder group from which it is originally fed. The exhaust-gas volume upstream of a channel is determined by the volume of the exhaust lines of the associated manifold and the volume of the overall exhaust line that connects the manifold to the inlet opening of the corresponding turbine channel. Relatively small volumes upstream of the at least one rotor permit impulse supercharging. Utilizing the pressure peaks that propagate in the exhaust manifolds, the available energy can be utilized in advantageous fashion with high turbine efficiencies. If the turbine is used in an exhaust-gas turbocharging system, it is possible in this way for the charge pressure at low engine speeds to be increased. However, the pressure fluctuations in the exhaust-gas discharge system that are considered disadvantageous within the context of ram supercharging at high engine speeds can be smoothed, and perhaps eliminated, by connecting the two channels of the turbine. Herein, the volumes of the exhaust-gas discharge system upstream of the at least one rotor may be combined, in some instances based on one or more engine conditions. Each individual channel then no longer communicates only with the exhaust system volume of the cylinder group associated therewith but likewise communicates with the exhaust system volume of the other cylinder group. In this way, an additional volume is provided for each channel, whereby the exhaust-gas volume upstream of each channel is enlarged, or one large volume is provided upstream of the rotor instead of two small volumes. Said volume enlargement ensures an exhaust-gas pressure which varies little, and is substantially constant, upstream of the at least one rotor, and therefore expedient conditions for ram supercharging at relatively high engine speeds or relatively high exhaust-gas flow rates.

As described and shown herein, the inlet region of a two-channel turbine has two inlet ducts. Multi-channel turbines are therefore particularly suitable for supercharged internal combustion engines in which the exhaust lines of the cylinders are merged in groups in order to realize impulse supercharging. The two channels, which can be connected to one another according to the present disclosure, of the two-channel turbine permit a switch between impulse supercharging and ram supercharging. The turbine may be fitted with a variable turbine geometry which can be adapted by adjustment to the respective operating point of the internal combustion engine.

In an internal combustion engine according to the present disclosure, the exhaust lines of at least two cylinders may be merged to form two overall exhaust lines such that two exhaust manifolds are formed. In this respect, embodiments having three, four, five or more cylinders, wherein the exhaust lines of more than two cylinders are merged to form two overall exhaust lines, are likewise internal combustion engines according to the description herein.

Embodiments may also be advantageous in which the at least one shut-off element can be electrically, hydraulically, pneumatically, mechanically or magnetically controlled, which may be further configured to be controlled by an engine controller of the internal combustion engine. The at least one shut-off body of valve may be configured so as to be adjustable, that is to say switchable, in stages, in such a way that it alternates between the rest position and multiple working positions and either closes off or opens up the flow transfer duct and/or the blow-off line, which simplifies the control and, in particular, offers cost advantages.

However, the description provided in terms of the at least one shut-off element or valve that is switchable in a continuously variable fashion in order, for example, to prevent an abrupt torque drop or torque increase during the displacement of the element, that is to say upon the transition from impulse supercharging to ram supercharging and vice versa. A continuously variable displacement also makes it possible for the exhaust-gas flow rate bypassed via the blow-off line to be set, that is to say dimensioned in a predefinable manner.

Embodiments of the supercharged internal combustion engine are advantageous in which the at least one piston-like shut-off element or flow transfer valve has a free plunger-like end which faces toward the channels. The plunger-like end ensures high mechanical and thermal load capacity of the shut-off element; in particular in relation to a flap or a displaceable thin and thus flexible housing wall. By virtue of the plunger-like end being located in a recess of the turbine housing, it is possible to ensure adequate sealing action and satisfactory separation of the channels when the shut-off element is in the rest position. Thus, embodiments of the supercharged internal combustion engine are also advantageous in which, when the at least one piston-like shut-off element is in the rest position, the free plunger-like end is located in a first recess that is provided in the turbine housing.

By means of including the piston-like shut-off element described herein, it is possible not only for adjacent channels to be connected to one another and separated from one another, but continuous displacement of the plunger-like end in the recess is enabled, for which it is possible for the flow cross section of the flow transfer duct, and thus the extent of interaction between the channels, to be influenced. The separation behavior of the channels, that is to say the degree of separation, can be directly influenced.

Embodiments of the supercharged internal combustion engine are advantageous in which the free plunger-like end has a first cylindrical section. The cylindrical section of the free plunger-like end ensures, in interaction with a first recess that corresponds in terms of shape, that jamming of the shut-off element in the event of rotation of the shut-off element is prevented. Furthermore, an end that tapers in pointed, that is to say conical fashion may serve as a centering means during the movement of the shut-off element into the first recess.

Embodiments of the supercharged internal combustion engine are advantageous in which the free plunger-like end transitions, with the formation of a transition region, into a second, thickened section which has a larger cross section than the plunger-like end. The second, thickened section serves for the mounting of the shut-off element during the displacement, that is to say in all positions. By virtue of the fact that the second section has a relatively large cross section, a transition region is formed which narrows from the second, thickened section toward the plunger-like end. This design of the shut-off element or flow transfer valve advantageously permits control of the blown-off exhaust-gas flow rate in the second working position with interconnected channels.

In this connection, embodiments of the supercharged internal combustion engine are advantageous in which the second, thickened section is of cylindrical form. The reasons are those which have already been mentioned above in conjunction with the cylindrical form of the first section, for which reason reference is made to the corresponding statements. In addition, embodiments of the supercharged internal combustion engine are also advantageous in which the transition region is of funnel-shaped form. Herein, embodiments of the supercharged internal combustion engine are advantageous in which the transition region is of frustoconical form. In this connection, embodiments of the supercharged internal combustion engine are advantageous in which, when the at least one piston-like shut-off element is in the rest position, the transition region is located in a second recess which is provided in the turbine housing and the shape of which corresponds to that of the transition region.

Embodiments of the supercharged internal combustion engine are advantageous in which the housing wall is an immovable wall that is fixedly connected to the housing. Said embodiment of the housing wall ensures that the heat introduced into the housing wall by the hot exhaust gas is discharged into and via the housing in an advantageous manner and to an adequate extent.

Embodiments of the supercharged internal combustion engine are advantageous in which the exhaust lines of the cylinders of each cylinder group merge to form a respective overall exhaust line, thus forming two exhaust manifolds, within the cylinder head. The two-channel turbine provided in the exhaust-gas discharge system may then be arranged very close to the outlet of the internal combustion engine, that is to say close to the outlet openings of the cylinders. This has several advantages, in particular because the exhaust lines between the cylinders and the turbine are shortened. Since the path to the turbine for the hot exhaust gases is shortened, the volume of the exhaust manifold or of the exhaust-gas discharge system upstream of the turbine also decreases. The thermal inertia of the exhaust-gas discharge system is likewise reduced as a result of the reduction of the mass and the length of the exhaust lines in question. In this way, the exhaust-gas enthalpy of the hot exhaust gases, which is determined significantly by the exhaust-gas pressure and the exhaust-gas temperature, may be utilized optimally, and a fast response behavior of the turbine ensured.

The proposed measure also results in a compact design of the cylinder head and thus of the internal combustion engine according to the present disclosure, and permits dense packaging of the drive unit as a whole. The shortening of the line lengths and the associated reduction in size of the exhaust-gas volume upstream of the turbine assists the impulse supercharging in the low load and engine speed range.

Embodiments of the supercharged internal combustion engine are advantageous in which the flow transfer duct is arranged at the rotor side, that is to say upstream of the at least one rotor and adjacent to the rotor. In this way, the exhaust line distance between the cylinder groups is lengthened yet further, in particular also in relation to an arrangement of the flow transfer duct in the inlet region of the turbine. The risk of mutual, in particular adverse influencing during the charge exchange is thereby yet further counteracted.

In the internal combustion engine according to the present disclosure, at least one exhaust-gas recirculation arrangement may be provided which comprises a recirculation line which branches off from the exhaust-gas discharge system and issues into the intake system. Exhaust-gas recirculation, that is to say the recirculation of combustion gases, is a suitable means for reducing the nitrogen oxide emissions, wherein it is possible for the nitrogen oxide emissions to be considerably reduced with increasing exhaust-gas recirculation rate. Here, the exhaust-gas recirculation rate $x_{EGR}$ is determined as $x_{EGR}=m_{EGR}/(m_{EGR}+m_{fresh\ air})$, where $m_{EGR}$ denotes the mass of recirculated exhaust gas and $m_{fresh\ air}$ denotes the supplied fresh air which, if appropriate, is conducted through a compressor and compressed. To obtain a considerable reduction in nitrogen oxide emissions, high exhaust-gas recirculation rates are required which may be of the order of magnitude of $x_{EGR}\approx 60\%$ to 70%.

Herein, embodiments of the internal combustion engine are advantageous in which a valve for adjusting the recirculated exhaust-gas flow rate is arranged in the recirculation line of the exhaust-gas recirculation arrangement. In the case of internal combustion engines having at least one exhaust-gas turbocharger and an exhaust-gas recirculation arrangement, embodiments are advantageous in which the recirculation line of the exhaust-gas recirculation arrangement branches off from the exhaust-gas discharge system upstream of the turbine of the at least one exhaust-gas turbocharger and issues into the intake system downstream of the compressor. In the case of this so-called high-pressure EGR arrangement, the exhaust gas does not have to be subjected to exhaust-gas aftertreatment before being recirculated, because there is no risk of fouling of the compressor. A conflict may however arise because the recirculated exhaust gas is no longer available for driving the turbine. In the event of an increase in the exhaust-gas recirculation rate, the exhaust-gas flow introduced into the turbine decreases, whereby the charge pressure likewise decreases. One solution is so-called low-pressure EGR, in which exhaust gas that has already flowed through the turbine is introduced into the intake system. For this purpose, the low-pressure EGR arrangement has a recirculation line which branches off from the exhaust-gas discharge system downstream of the turbine and issues into the intake system upstream of the compressor. The exhaust gas which is recirculated via the low-pressure EGR arrangement to the inlet side is mixed with fresh air upstream of the compressor. The mixture of fresh air and recirculated exhaust gas produced in this way forms the charge air which is supplied to the compressor and compressed.

For the reasons stated above, embodiments of the internal combustion engine may be advantageous in which the recirculation line of the exhaust-gas recirculation arrangement branches off from the exhaust-gas discharge system downstream of the turbine of the at least one exhaust-gas turbocharger and issues into the intake system upstream of the compressor.

FIGS. 2A-D show, schematically and partially in section, a fragment of housing 2 of the two-channel turbine 1 of a first embodiment of the supercharged internal combustion engine, with a shut-off element described herein as a flow transfer valve 15 in different positions. For simplicity, only the additional features in relation to FIGS. 1A-C are discussed, for which reason reference is made otherwise to said figures and the associated descriptions. The same reference symbols have been used for the same components.

The present description includes a two-channel turbine, comprising a longitudinally displaceable flow transfer valve arranged within a flow transfer duct that couples a first channel of the two-channel turbine to a second channel of the two-channel turbine, the valve arranged lateral relative to the flow of exhaust gas, wherein a position of the valve relative to the duct controls the extent of communication between the first and second channels and a waste gate passage.

Figure 2A:
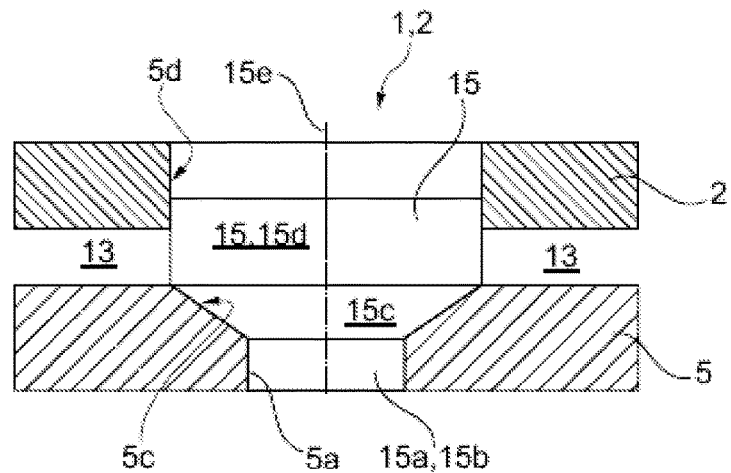
FIG. 2A shows, schematically and partially in section along the line A-A indicated in FIG. 2D, a fragment of the housing of the two-channel turbine according to a first embodiment with a shut-off element situated in the rest position.
Figure 2B:
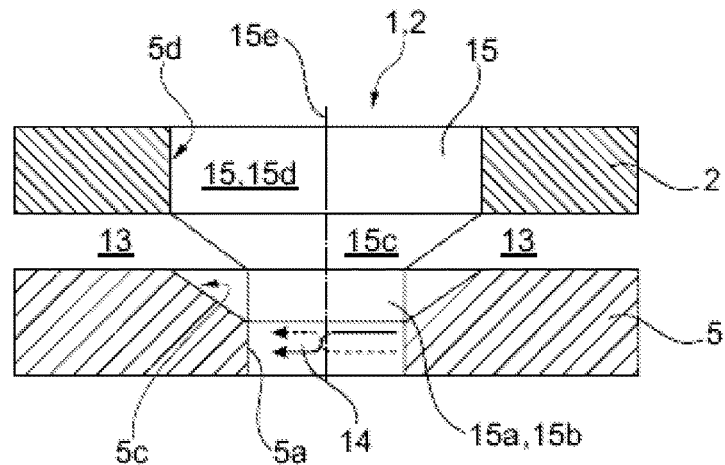
FIG. 2B shows, schematically and partially in section along the line A-A of FIG. 2D, the shut-off element of FIG. 2A situated in a first working position.
Figure 2C:
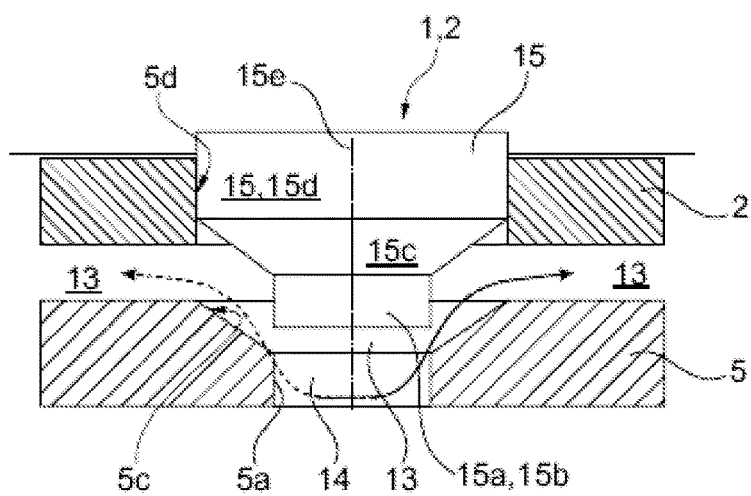
FIG. 2C shows, schematically and partially in section along the line A-A indicated in FIG. 2D, the shut-off element situated in a second working position.
Figure 2D:
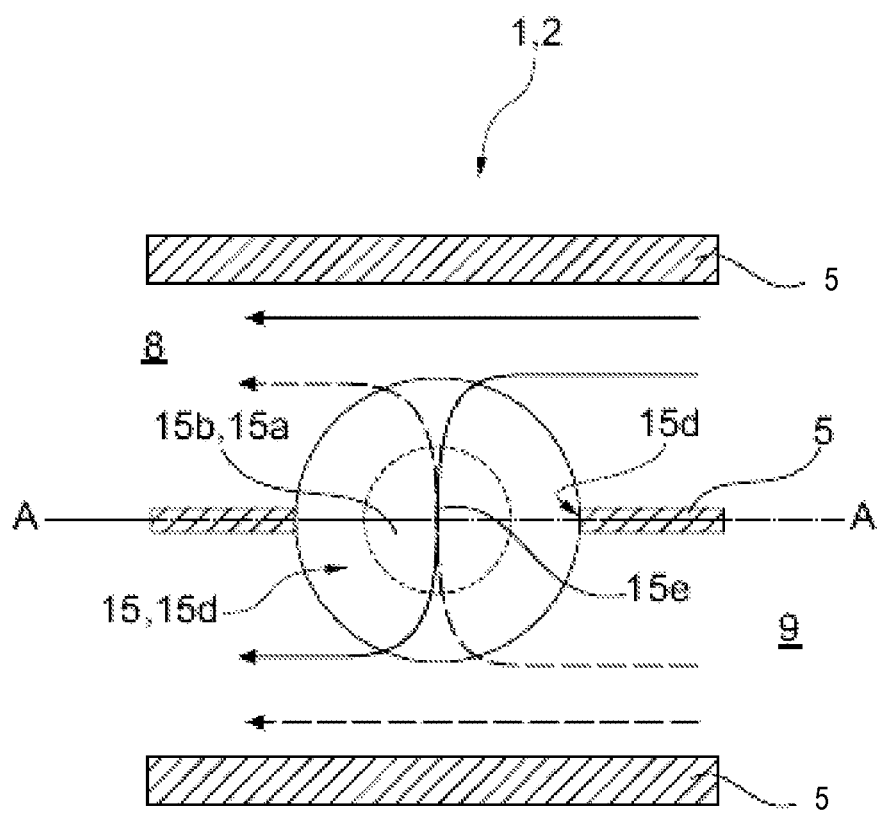
FIG. 2D schematically shows, in a plan view and partially in section perpendicular to the displacement direction of the shut-off element, the housing fragment illustrated in FIGS. 2A, 2B and 2C.

FIG. 2A shows, schematically and partially in section along the line A-A indicated in FIG. 2D, a fragment of the housing of the two-channel turbine according to a first embodiment with a shut-off element situated in the rest position. In order that the two channels 8, 9 of turbine 1, which are separated from one another within turbine housing 2 by means of a housing wall 5, can be connected to one another and separated from one another upstream of the rotor by virtue of a flow transfer duct 14 that is opened up and shut off by a piston-like shut-off element 15 referred to as flow transfer valve. Flow transfer valve 15 is provided which is displaceable in translational fashion along its longitudinal axis 15e.

In the rest position shown, the two channels 8, 9 of turbine 1 are separated from one another. In this way, a rest position of valve 15 within duct 14 completely separates the first and second channels of the two-channel turbine while simultaneously blocking exhaust airflow to the waste gate passage, the exhaust airflow through the first and second channels being directed separately to a rotor of the two-channel turbine. For this reason, the piston-like shut-off element has a free plunger-like end 15a which faces toward the channels 8, 9 and which has a first cylindrical section 15b which, in the rest position, is mounted in a first recess 5a of the turbine housing.

Along the longitudinal axis 15e of the shut-off element of flow transfer valve 15, the free plunger-like end 15a transitions, with the formation of a transition region 15c, into a second, thickened section 15d which has a larger cross section than the plunger-like end 15a or the first cylindrical section 15b of the plunger-like end 15a. In the embodiment illustrated in FIG. 2A, the transition region 15c is of frustoconical form, and the second, thickened section 15d is of cylindrical form. When the shut-off element 15 is in the rest position, the transition region 15c is located in a second recess 5c of the turbine housing, the shape of which second recess corresponds to that of the transition region 15c. The second, thickened section 15d serves for the mounting of the shut-off element of flow transfer valve 15 during the displacement, that is to say in all positions, for which purpose the second section 15d is mounted displaceably in a third recess 5d of the housing 2. In the present case, the blow-off line 13 is blocked.

FIG. 2B shows, schematically and partially in section along the line A-A of FIG. 2D, the shut-off element of FIG. 2A situated in a first working position. In a first working position, valve 15 within duct 14 allows communication between only the first and second channels of the two-channel turbine while simultaneously blocking exhaust airflow to the waste gate passage. In other words, by transferring the piston-like shut-off element of flow transfer valve 15 into a first working position, a flow transfer duct 14 is opened up, and the two channels 8, 9 of turbine 1 are connected to one another via a transverse flow through the duct, as illustrated in FIG. 2B. The exchange of exhaust gas between the channels 8, 9, the so-called flow transfer, is indicated by the arrows.

Inclusion of plunger-like end 15a to fit within first recess 5a of the flow transfer duct in a rest position, the flow transfer valve completely occupying the first recess in the rest position, allows for separate airflows through the separate exhaust channels, and thereby impulse supercharging. However, in the first working position, plunger-like end 15a only partially occupies first recess 5a of the flow transfer duct, the flow transfer valve partially occupying the first recess fluidically coupling the separate channels. In this way, the flow transfer valve may be continuously adjustable in some instances to allow for a more fine control of the transition between impulse supercharging and ram supercharging modes of an internal combustion engine. According to the present description, the position of plunger-like end 15a of flow transfer valve 15 relative to the flow transfer duct 14 controls the extent of fluidic coupling between the separate exhaust channels. For this reason, shape of the plunger-like end may be cylindrical in some examples. However, this is non-limiting and other shapes are possible.

The advantage of the system according to the present disclosure is that within the first working position, the position of the valve can be finely adjusted to control the extent of communication between the first and second channels only responsive to the extent that the plunger-like end 15a of flow transfer valve 15 occupies first recess 5a of the flow transfer duct. In this way, the longitudinal position of the valve may be adjusted to allow for increasing or decreasing the airflow between the first and second channels.

FIG. 2C shows, schematically and partially in section along the line A-A indicated in FIG. 2D, the shut-off element situated in a second working position. As a result of a further displacement of the shut-off element 15 into a second working position, the plunger-like end 15a departs from the first recess 5a, whereby the two channels 8, 9 are connected to one another and also to a blow-off line 13 (or waste gate passage) that is opened up responsive to the further displacement, as shown in FIG. 2C. Blow-off line 13 branches off from the exhaust-gas discharge system upstream of the rotor and conducts exhaust gas past the rotor of turbine 1. The advantage of this configuration is that the exhaust-gas flow rate conducted past the rotor 3 via the blow-off line 13 can also be adjusted in a simply, yet precise manner by displacement of the shut-off element of flow transfer valve 15 within the second working position.

Flow transfer valve 15 further includes a second, thickened section 15d having a larger cross section than plunger-like end 15a, the valve including a transition region 15c that connects the plunger-like end 15a to the second, thickened section 15d. As shown in FIGS. 2A-C, the transition region has a funnel shape frustoconical in form that allows for positioning the transition region within a second recess 5c of the flow transfer duct that is advantageously configured with a shape that corresponds to the transition region of the valve. The further displacement of the valve into the second working position thus places flow transfer valve 15 such that plunger-like end 15a resides within second recess 5c of the flow transfer duct 14, the flow transfer valve residing in the second recess exposing blow-off line 13 that allows exhaust-gas blow-off.

For example, in a second working position, the position of valve 15 within duct 14 allows communication between the first and the second channels, as well as the waste gate passage. More specifically, the position of plunger-like end 15a of flow transfer valve 15 relative to a second recess 5c of the duct allows for extent of communication between both the first and second channels and the waste gate passage responsive to the position of the plunger-like end within the second recess 5c of the flow transfer duct.

FIG. 2D schematically shows, partially in section perpendicular to the displacement direction 15e of the shut-off element of flow transfer valve 15, the housing fragment illustrated in FIGS. 2A-C.

In an internal combustion engine according to the present disclosure, the volume of the exhaust-gas discharge system communicating with an individual channel of the turbine can thus be varied, specifically by virtue of the two channels of the turbine being connected or separated. Consequently, it is also possible for the exhaust-gas volume or the exhaust-gas discharge system upstream of the at least one rotor of the two-channel turbine to be adapted to different operating conditions of the internal combustion engine, in particular to different exhaust-gas flow rates or different engine speeds, and optimized in this regard.

As one example, the two-channel turbine described may be used in an engine that comprises at least two cylinders arranged into different groups; independent exhaust lines flowing therefrom into separate exhaust channels based on cylinder group; and a two-channel turbine configured to receive the separate exhaust flows that comprises a longitudinally displaceable flow transfer valve arranged laterally relative to the exhaust flows positioned within a flow transfer duct, the position of the valve relative to the duct controlling the extent of fluidic coupling between the separate channels. In some instances, it is possible for the flow transfer valve described to be located outside of the turbine, however, for simplicity, the position of the valve is described relative to the two-channel turbine based on an exemplary fragment of the housing. Herein, the flow transfer valve is arranged laterally and located upstream of a rotor of the two-channel turbine.

As another example, methods are enabled by means of a supercharged internal combustion engine having at least one cylinder head with at least two cylinders, in which each cylinder has at least one outlet opening for discharging the exhaust gases out of the cylinder via an exhaust-gas discharge system, and each outlet opening is adjoined by an exhaust line; at least two cylinders are configured in such a way as to form two groups with in each case at least one cylinder; the exhaust lines of the cylinders of each cylinder group merge to form a respective overall exhaust line, thus forming an exhaust manifold; the two overall exhaust lines are connected to a two-channel turbine, which comprises at least one rotor mounted on a rotatable shaft in a turbine housing, in such a way that in each case one overall exhaust line is connected to one of the two channels of the two-channel turbine, the two channels being separated from one another as far as the at least one rotor by means of a housing wall and being connectable to one another within the turbine housing upstream of the at least one rotor by virtue of at least one flow transfer duct being opened up, and at least one exhaust-gas recirculation arrangement is provided, and wherein at least one piston-like shut-off element is provided which is displaceable in translational fashion and which, in a rest position, separates the two channels of the turbine from one another, in a first working position, connects the two channels of the turbine to one another by opening up the flow transfer duct, and in a second working position, connects the two channels of the turbine to one another by opening up the flow transfer duct and opens up a blow-off line which branches off from the exhaust-gas discharge system upstream of the at least one rotor. When arranged in this way, the methods described thus permit optimized operation over the entire operating range, in particular both at low engine speeds and at relatively high engine speeds.

In relation to the connection of the two exhaust manifolds, the connection of the two channels of the turbine according to the present disclosure has the advantage that the at least one flow transfer duct that connects the exhaust volumes of the two cylinder groups is arranged further remote from the outlet openings of the cylinders, whereby the exhaust-line distance between a cylinder of one group and a cylinder of the other group is increased. The risk of mutual, in particular adverse influencing during the charge exchange is thereby counteracted. The above-described residual gas problem or knocking problem is alleviated or eliminated.

The relationships and effects described above are highly relevant in particular in the case of supercharged internal combustion engines in which the exhaust lines of the cylinders of each cylinder group merge in each case to form an overall exhaust line, such that an exhaust manifold is formed, within the cylinder head, because a connection of the manifolds would result in the realization of a connection situated extremely close to the outlet openings of the cylinders.

According to the present disclosure, a piston-like shut-off element is provided which is designed to be displaceable in translational fashion. As described and shown, the valve is oriented with a position lateral to the exhaust airflow. Herein, a lateral arrangement means an angular orientation relative to the flow of exhaust through the exhaust passages or channels. Although the valve is oriented substantially perpendicular herein, in some instances, the valve may be oriented with another angular displacement (e.g., a range of 60° up to 90° relative to the exhaust-gas airflow). When the shut-off element is in the rest position, the two channels of the turbine are separated from one another, and the internal combustion engine is supercharged by impulse supercharging. By virtue of the shut-off element being transferred into a first working position, a flow transfer duct is opened up which connects the two channels to one another for the purpose of realizing ram supercharging. Proceeding from a first working position, further displacement of the piston-like shut-off element into a second working position causes a blow-off line to be opened up, via which exhaust gas can be conducted past the turbine. For this purpose, the blow-off line branches off from the exhaust-gas discharge system upstream of the at least one rotor.

Embodiments of the supercharged internal combustion engine are advantageous in which the at least one piston-like shut-off element is discretely switchable between the rest position and a first working position. This embodiment of the shut-off element permits separation and connection of the adjacent channels, whereas the separation behavior of the channels, that is to say the degree of separation, cannot be influenced because this requires a continuous displacement of the shut-off element. However, embodiments of the supercharged internal combustion engine are also advantageous in which the at least one piston-like shut-off element is continuously adjustable. In particular, embodiments of the supercharged internal combustion engine are advantageous in which the at least one piston-like shut-off element is adjustable in continuous fashion between a first working position and a second working position for the purpose of adjusting the blown-off exhaust-gas flow rate. Such a design of the valve permits continuously variable control of the blown-off exhaust-gas flow rate in the second working position with interconnected channels, that is to say precise dosing of the exhaust-gas flow rate conducted past the turbine or the at least one rotor. Although the valve herein is described upstream of the rotor, embodiments of the supercharged internal combustion engine are advantageous in which the blow-off line opens into the exhaust-gas discharge system downstream of the at least one rotor. Said embodiment makes it possible for both the blown-off exhaust gas and also the exhaust gas that is conducted through the turbine to undergo aftertreatment in a common exhaust-gas aftertreatment system provided in the exhaust-gas discharge system.

Figure 3C:
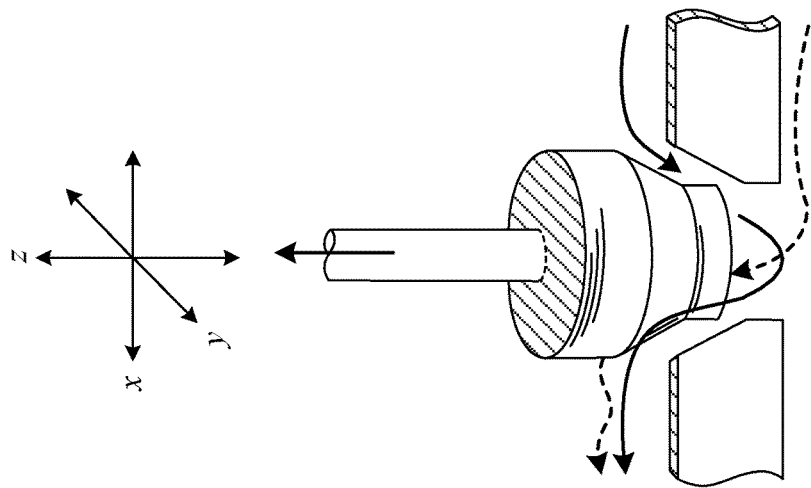
FIGS. 3A-C show a simplified view of the example flow transfer valve and flow transfer duct to illustrate an exemplary flow exchange through the duct in greater detail.
Figure 3B:
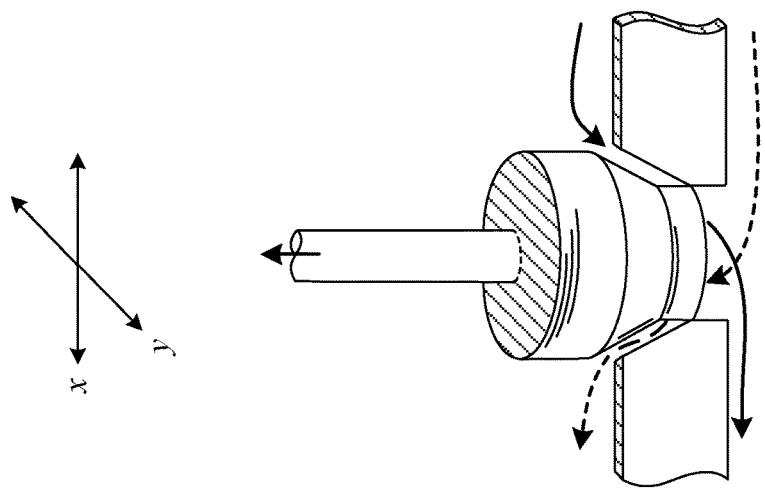
Figure 3A:
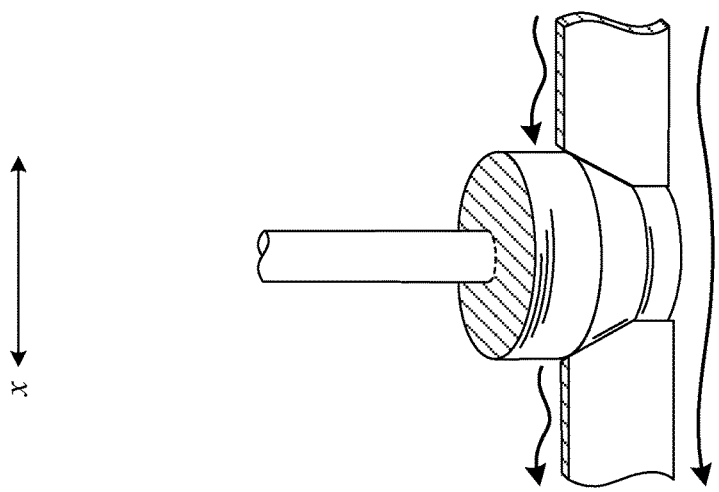

FIGS. 3A-C show a simplified view of the example flow transfer valve and flow transfer duct to illustrate an exemplary flow exchange through the duct in greater detail based on the position of the valve. Arrows are included to show the flow of air through the duct, however, for simplicity, only the new flow path opened up by the valve displacement is shown schematically. Coordinate axes are also provided to provide for a simplified description of the exhaust airflow through the duct.

FIG. 3A shows the valve in the rest position. When the flow transfer valve is adjusted to a rest position by inserting plunger-like end 15a of the flow transfer valve completely into the first recess of the flow transfer duct configured to receive the plunger-like end, separate airflows through each of the exhaust channels are allowed. The separate airflows are indicated by arrows that substantially flow in the x-direction indicated by the coordinate axis place thereabove. As noted already, separate exhaust-gas airflows provide for impulse supercharging.

FIG. 3B shows the valve in the first working position, wherein the plunger-like end partially occupies the first recess of the flow transfer duct, which allows for controlling the extent of fluidic coupling between each channel of the two exhaust channels. Although opening of the valve to the first working position may reduce an airflow within a channel to reduce pressure fluctuations, FIG. 3B only shows the new airflow pathway exposed responsive to the change of valve position into the first working position from the rest position of FIG. 3A. Thus, airflow along the x-axis shown within each channel may be transversely directed through the duct in a direction of the y-axis and into the other channel, in addition at least a portion of the airflow within each channel continuing along the x-direction down that channel (not shown). With the flow pattern indicated, the airflow between each channel may be coupled while the blow-off line is simultaneously blocked, which allows for ram supercharging.

FIG. 3C shows the valve in the second working position, wherein the plunger-like end is located within a second recess of the flow transfer duct, whose shape corresponds to a transition region of the flow transfer valve coupling the plunger-like end to a second, thickened section of the flow transfer valve that has a larger cross-section than the plunger-like end, the second working position determining the rate of exhaust-gas flow conducted past a rotor of the two-channel turbine via a blow-off line. In a similar manner as just described, FIG. 3C only shows the new airflow pathway exposed responsive to further displacement of the position into the second working position. Thus, airflow along the x-axis within each channel, and through the duct along the y-axis may be further directed in the direction of the z-axis and into a blow-off line (not shown). In addition, a portion of the airflow within each channel may continue to flow within each channel as well as through the other channel. In this way, the extent of communication between the first channel 8, second channel 9 and a blow-off line 13 may be controlled based on the engine conditions. With the flow pattern indicated, the rate of exhaust-gas flow conducted past a rotor of the two-channel turbine via a blow-off line can be further controlled.

Figure 4A:
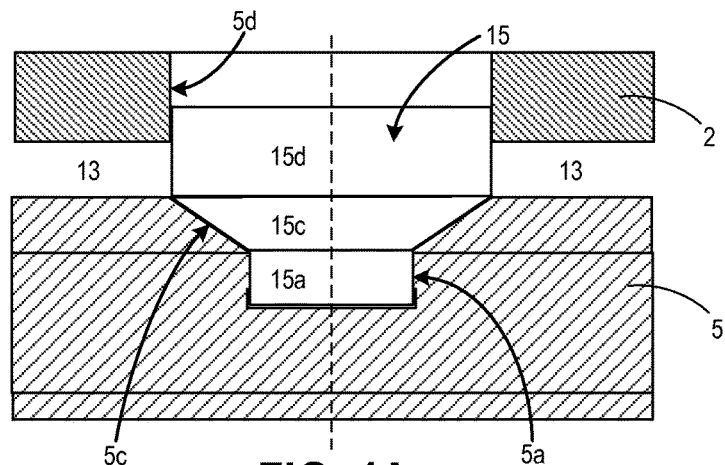
FIGS. 4A-D illustrate a second representation of the present disclosure.
Figure 4B:
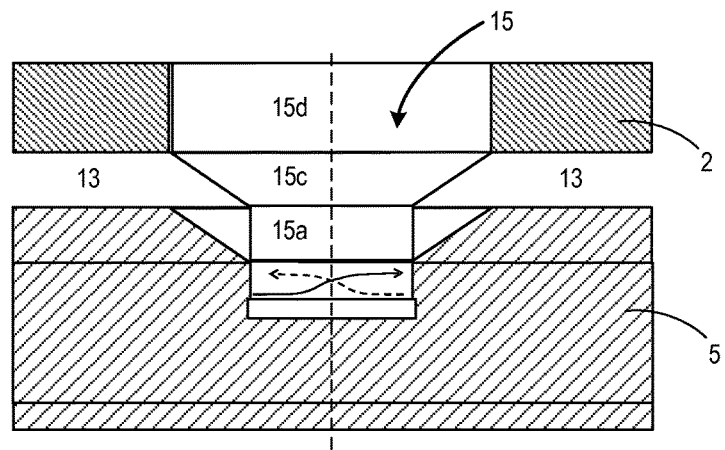
Figure 4C:
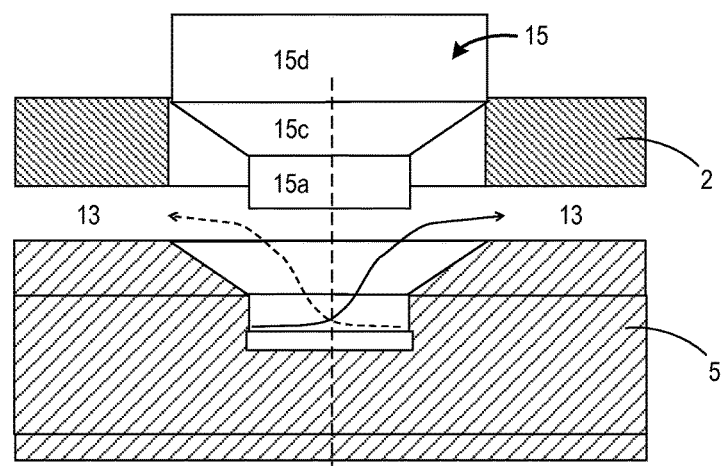
Figure 4D:
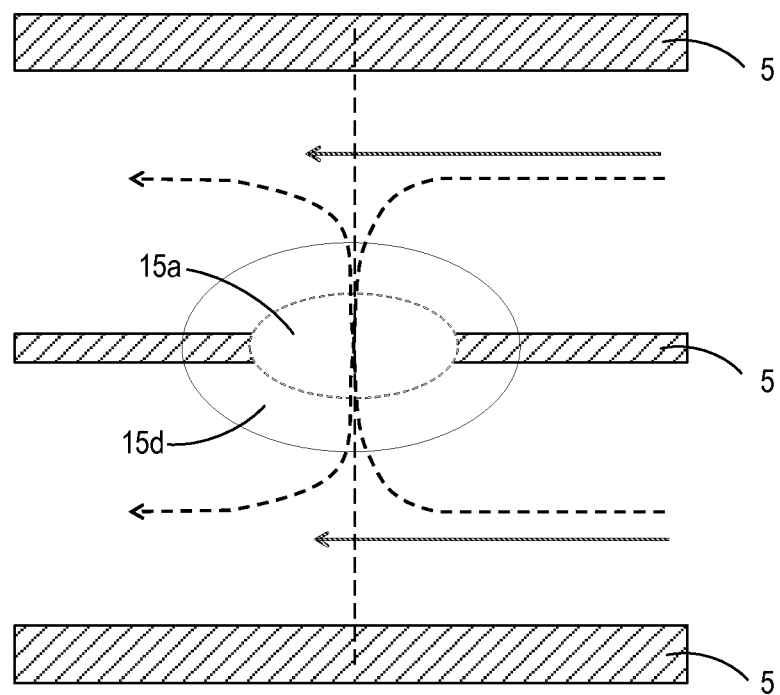

FIGS. 4A-D illustrate a second representation of the flow transfer valve relative to the housing wall in greater detail compared to FIGS. 2A-D. Specifically, the structure of housing wall 5 below flow transfer valve 15 is included. Although the three working positions and airflows thereof are identical to the description already provided, FIG. 4A illustrates that in the rest position, plunger-like end 15a completely occupies the first recess 5a of the flow transfer duct. Adjustment of the valve into the first working position shown in FIG. 4B exposes the first recess to allow a transverse flow between each channel through the duct that couples the channels. FIG. 4C shows the airflow into blow-off line 13, while FIG. 4D schematically shows, partially in section perpendicular to the displacement direction 15e of the shut-off element of flow transfer valve 15, the housing fragment illustrated in FIGS. 4A-C.

FIGS. 5A-C illustrate a third representation of the present disclosure to illustrate airflow pathways responsive to valve position. Specifically, the third representation shows a side view taken in the direction of the arrows of FIG. 4D, that is, along the exhaust airflow. FIGS. 5A-C again illustrate the position of the valve in rest, first, and second positions, respectively. Although not shown, displacement of the valve in one or more of the first and second working positions may be continuously adjusted in some instances.

FIG. 5A shows the valve completely occupying the first recess to de-couple the channels and provide separate exhaust flows. In the rest position, communication between first channel 8 and second channel 9 is blocked. In addition, communication between first channel 8 and blow-off line 13 is also blocked, as is communication between second channel 9 and blow-off line 13. In other words, separate exhaust flow occurs with no exhaust blow-off.

FIG. 5B shows the valve in the first working position that allows coupling of the exhaust channels and a transverse airflow through the duct. In the first working position, communication between the first channel 8 and second channel 9 occurs. However, communication between first channel 8 and blow-off line 13 remains blocked, as does communication between second channel 9 and blow-off line 13. With this arrangement, exhaust airflow is simultaneously directed through and between each channel.

FIG. 5C shows the valve in the second working position that further exposes blow-off line 13. In the second working position, communication between the first channel 8 and blow-off line 13 occurs, as well as communication between second channel 9 and blow-off line 13. In addition, first channel 8 and second channel 9 also communicate with one another. In this way, the relative flow of exhaust-gases may be controlled to control flow rates therein.

That which has been stated in connection with the internal combustion engine according to the description above likewise applies to the methods according to the present disclosure. Turning to a description of one such method, FIG. 6 shows example routine 600 for controlling the position of the valve to adjust the extent of coupling between exhaust channels and the waste gate passage. As described, the method according to the present description allows for controlling a supercharged internal combustion engine, the method comprising adjusting a flow transfer valve position to control an extent of fluidic coupling between each channel of a two-channel turbine and a wastegate passage distinct from each channel, the flow transfer valve coupled to each exhaust channel and arranged lateral to the exhaust airflow therein, wherein the valve position is based on a longitudinal displacement of the valve relative to a flow transfer duct.

At 610, routine 600 includes comparing the engine load to a first threshold. For example, at low engine speeds, impulse supercharging may be desired whereas at higher engine speeds, ram supercharging may be desired. The first threshold may thus indicate a speed that allows for adjusting between impulse and ram supercharging. The methods further support adjusting an extent of, e.g., ram supercharging by adjust the extent of coupling between the exhaust channels. For simplicity, if a variable such as engine speed falls below the first threshold, the position of the valve may be adjusted to the rest position, as indicated at box 612. In this way, routine 600 further comprises adjusting the valve position to a rest position by inserting a plunger-like end of the flow transfer valve completely into a first recess of the flow transfer duct that is configured to receive the plunger-like end, the rest position allowing separate airflow through each of the exhaust channels. In the rest position, impulse supercharging may occur. Method variants are advantageous in which, proceeding from a state in which the channels are connected to one another, the two channels of the turbine are separated from one another, by displacement of the at least one shut-off element into the rest position, if the engine speed or the exhaust-gas flow rate from the two cylinder groups falls below a predefined value.

Alternatively, if the engine speed exceeds the first threshold, the valve may be longitudinally displaced to occupy the first working position, as indicated at box 614. In this way, routine 600 further comprises adjusting the valve to a first working position wherein the plunger-like end partially occupies the first recess of the flow transfer duct, the first working position determining the extent of fluidic coupling between each channel of the two exhaust channels. Advantageous methods are enabled in which the two channels of the turbine are connected to one another when the engine speed $n_{mot}$ of the internal combustion engine exceeds a predefinable engine speed $n_{mot,down}$. However, method variants are also advantageous in which the two channels of the turbine are connected to one another when the exhaust-gas flow rate exceeds a first predefinable exhaust-gas flow rate, for example. In this connection, method variants are advantageous in which the two channels of the turbine are connected to one another if the engine speed $n_{mot}$ of the internal combustion engine exceeds a predefinable engine speed $n_{mot,down}$ or the exhaust-gas flow rate of the two cylinder groups exceeds the first predefinable exhaust-gas flow rate, and the engine speed or exhaust-gas flow rate remains higher than said predefined engine speed or the first predefined exhaust-gas flow rate for a predefinable period of time $\Delta t_1$. Thereafter, ram supercharging may occur, for example, as the engine is operated under a high engine load.

The introduction of an additional condition for the connection of the two channels is intended to prevent an excessively frequent mode change between impulse supercharging and ram supercharging, in particular a transition to ram supercharging if the engine speed or exhaust-gas flow rate only briefly exceeds the predefined value and then falls again or fluctuates around the predefined value, without the exceedance justifying a transition to ram supercharging.

At 620, a second threshold is included to allow for exhaust blow-off in the event a high load on the engine occurs that reduces turbine efficiency or puts undue stress on the engine, e.g., by increasing a pressure at an inlet. At 622, routine 600 comprises adjusting the valve to the second working position wherein the plunger-like end is located within a second recess of the flow transfer duct, whose shape corresponds to a transition region of the flow transfer valve coupling the plunger-like end to a second, thickened section of the flow transfer valve that has a larger cross-section than the plunger-like end, the second working position determining the rate of exhaust-gas flow conducted past a rotor of the two-channel turbine via a blow-off line. In this way, methods are advantageous in which the blow-off line is opened up, by displacement of the at least one shut-off element, if the exhaust-gas flow rate from the two cylinder groups exceeds a second predefinable exhaust-gas flow rate, for which purpose the at least one shut-off element is displaced into the second working position.

Continuing to 624, routine 600 may further comprise actuating the flow transfer valve in the second position to control the extent of exhaust-gas blow-off based on one or more engine conditions (e.g., engine load and/or speed, exhaust flow rate, etc.). In this context, method variants are advantageous in which the exhaust-gas flow rate conducted past the at least one rotor via the blow-off line is set by displacement of the at least one shut-off element within the second working position. Alternatively, while the engine speed falls below the second threshold, at 626, routine 600 includes actuating the flow transfer valve in the first position to control the extent of coupling, and thereby, ram supercharging based on engine operating conditions.

In another representation, a method may be allowed for operating an engine that comprises adjusting a supercharge mode by adjusting a flow transfer valve position of a two-channel turbine, wherein adjusting the valve position includes displacing the valve along a longitudinal axis of the valve relative to a flow transfer duct, the position further controlling the extent of fluidic coupling between each channel of the two-channel turbine, wherein the extent of fluidic coupling determines the supercharge mode that is controlled based on one or more of engine speed, engine load and exhaust-gas flow rate. Following the description above, the method further comprises adjusting the supercharge mode to an impulse mode based on completely de-coupling the exhaust flows to allow separate airflow through each channel of the two-channel turbine, the de-coupling being responsive to the one or more of engine speed, engine load and exhaust-gas flow rate falling below a first threshold, wherein the adjustment is based on positioning a plunger-like end of the flow transfer valve completely within a first recess of the flow transfer duct. Then, displacement of the valve into the first position may be performed, the method comprising adjusting the supercharge mode to a ram mode based on coupling the exhaust flows through each channel of the two-channel turbine, the extent of coupling responsive to the one or more of engine speed, engine load and exhaust-gas flow rate exceeding the first threshold but falling below a second threshold, wherein the extent of coupling is based on positioning the plunger-like end of the flow transfer valve partially within the first recess of the flow transfer duct, and wherein the extent of coupling is based on the position of the plunger-like end relative to the first recess. Displacement of the valve into the second position may be further performed, the method further comprising adjusting the supercharge mode to a blow-off mode based on exposing a blow-off line, the exhaust-gas blow-off occurring responsive to the one or more of engine speed, engine load and exhaust-gas flow rate exceeding the second threshold, wherein the extent of exhaust-gas blow-off is based on a position of the plunger-like end of the flow transfer valve relative to a second recess of the flow transfer duct whose shape corresponds to a transition region of the flow transfer valve connecting the plunger-like end to a second, thickened section with a larger cross section than the plunger-like end.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine, comprising:
    at least two cylinders arranged into different groups;
    independent exhaust lines flowing exhaust gas from each of the at least two cylinders into separate exhaust channels based on cylinder group; and
    a two-channel turbine configured to receive the exhaust gas from the separate exhaust channels, the two-channel turbine comprising a longitudinally displaceable flow transfer valve arranged laterally relative to a flow of the exhaust gas positioned within a flow transfer duct, a position of the flow transfer valve relative to the flow transfer duct controlling an extent of fluidic coupling between the separate exhaust channels,
    the flow transfer valve including a protruding end configured to fit within a first recess of the flow transfer duct in a rest position; and
    wherein a first working position of the flow transfer valve fluidly couples the separate exhaust channels while blocking a blow-off line, where the blow-off line is adjacent to the separate exhaust channels.

2. The engine of claim 1, wherein the flow transfer valve arranged laterally is located upstream of a rotor of the two-channel turbine.

3. The engine of claim 2, wherein the flow transfer valve completely occupies the first recess in the rest position allowing separate airflows through the separate exhaust channels.

4. The engine of claim 3, wherein the flow transfer valve further includes a thickened section with a larger cross section than the protruding end, the flow transfer valve including a transition region connecting the protruding end to the thickened section.

5. The engine of claim 4, wherein the transition region has a funnel shape frustoconical in form that allows for positioning the transition region within a second recess of the flow transfer duct configured with a shape that corresponds to the transition region.

6. The engine of claim 5, wherein the protruding end of the flow transfer valve only partially occupies the first recess of the flow transfer duct in the first working position, the protruding end of the flow transfer valve partially occupying the first recess in the first working position fluidically coupling the separate exhaust channels.

7. The engine of claim 6, wherein the protruding end of the flow transfer valve resides in the second recess of the flow transfer duct in a second working position, the protruding end of the flow transfer valve residing in the second recess in the second working position allowing exhaust-gas blow-off.

8. The engine of claim 7, wherein the flow transfer valve is continuously adjustable in one or more of the first working position and the second working position, a position of the protruding end of the flow transfer valve relative to the flow transfer duct controlling the extent of fluidic coupling between one or more of the separate exhaust channels and the exhaust-gas blow-off.

9. The engine of claim 8, wherein one or more of the protruding end and the thickened section has a cylindrical shape.

10. The engine of claim 9, wherein the two-channel turbine is one of a dual-flow turbine and a twin-flow turbine.

11. A two-channel turbine, comprising:
    a longitudinally displaceable valve arranged within a duct and arranged laterally relative to an exhaust flow, the flow transfer valve including a protruding end configured to fit within a first recess of the flow transfer duct;
    where a first valve position fluidly couples a first channel to a second channel of the two-channel turbine while blocking a blow-off line,
    a second valve position fluidly couples the first channel, the second channel, and the blow-off line, and
    at rest, the valve separates the first and second channels while blocking the blow-off line.

12. The two-channel turbine of claim 11, wherein, when the valve is at rest, the exhaust flow is directed through the first and second channels and the exhaust flow is directed separately to a rotor of the two-channel turbine.

13. The two-channel turbine of claim 12, wherein the first valve position within the duct allows communication only between the first and second channels of the two-channel turbine while simultaneously blocking exhaust airflow to the blow-off line.

14. The two-channel turbine of claim 3, wherein an extent of communication between only the first and second channels in the first valve position is determined responsive to an extent that the protruding end of the valve occupies a first recess of the duct.

15. The two-channel turbine of claim 14, wherein an extent of communication between the first channel, the second channel, and the blow-off line in the second valve position is determined responsive to a position of the protruding end of the valve relative to a second recess of the duct.

16. A method of controlling a supercharged internal combustion engine, comprising:

adjusting a flow transfer valve position to control an extent of fluidic coupling between each channel of a two-channel turbine and a blow-off line distinct from each channel, a flow transfer valve coupled to each channel and arranged lateral to an exhaust airflow therein, wherein the flow transfer valve position is based on a longitudinal displacement of the flow transfer valve relative to a flow transfer duct;

adjusting the flow transfer valve position to a rest position by inserting a protruding end of the flow transfer valve completely into a first recess of the flow transfer duct that is configured to receive the protruding end, the rest position allowing separate airflow through each of the channels;

adjusting the flow transfer valve to a first working position wherein the protruding end partially occupies the first recess of the flow transfer duct, the first working position determining the extent of fluidic coupling between each channel of two exhaust channels; and adjusting the flow transfer valve to a second working position wherein the protruding end is located within a second recess of the flow transfer duct, whose shape corresponds to a transition region of the flow transfer valve coupling the protruding, end to a thickened section of the flow transfer valve that has a larger cross-section than the protruding end, the second working position determining a rate of exhaust-gas flow conducted past a rotor of the two-channel turbine via a blow-off line.

\* \* \* \* \*

UNITED STATES PATENT AND TRADEMARK OFFICE
CERTIFICATE OF CORRECTION

PATENT NO.        : 10,006,342 B2
APPLICATION NO.   : 14/610649
DATED             : June 26, 2018
INVENTOR(S)       : Smiljanovski et al.

Page 1 of 1

It is certified that error appears in the above-identified patent and that said Letters Patent is hereby corrected as shown below:

In the Claims

Column 22, Line 55, Claim 14, "claim 3" should read "claim 13".

Signed and Sealed this
Eleventh Day of September, 2018

Andrei Iancu
*Director of the United States Patent and Trademark Office*